(12) United States Patent
Tateishi et al.

(10) Patent No.: US 8,209,671 B2
(45) Date of Patent: *Jun. 26, 2012

(54) COMPUTER PROGRAM TESTING AFTER SOURCE CODE MODIFICATION USING EXECUTION CONDITIONS

(75) Inventors: Takaaki Tateishi, Kanagawa (JP); Fumihiko Kitayama, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 992 days.

This patent is subject to a terminal disclaimer.

(21) Appl. No.: 12/172,254

(22) Filed: Jul. 13, 2008

(65) Prior Publication Data
US 2008/0270993 A1 Oct. 30, 2008

Related U.S. Application Data

(63) Continuation of application No. 11/318,911, filed on Dec. 24, 2005, now Pat. No. 7,844,955.

(51) Int. Cl.
*G06F 9/44* (2006.01)
*G06F 11/00* (2006.01)
(52) U.S. Cl. ........................ 717/131; 714/38.1; 714/100
(58) Field of Classification Search .................. 717/131; 714/38, 100
See application file for complete search history.

(56) References Cited

U.S. PATENT DOCUMENTS

| 5,542,043 A | 7/1996 | Cohen et al. | |
|---|---|---|---|
| 5,778,169 A * | 7/1998 | Reinhardt | 714/38.1 |
| 6,192,511 B1 * | 2/2001 | Johnston et al. | 717/109 |
| 7,496,904 B2 * | 2/2009 | Srivastava et al. | 717/133 |
| 2003/0212924 A1 * | 11/2003 | Avvari et al. | 714/38 |
| 2005/0044533 A1 * | 2/2005 | Nesbit et al. | 717/124 |
| 2005/0114736 A1 * | 5/2005 | Larsen | 714/38 |

OTHER PUBLICATIONS

Binkley, David; "The application of program slicing to regression testing," Elsevier, 1998, 24 pg.*
Rothermel et al., "Prioritizing Test Cases for Regression Testing," IEEE, 2001, 19pg.*
A. Hartman et al., "The AGEDIS Tools for Model Based Testing," Proceedings of ISSTA '04, Jul. 11-14, 2004, Boston, Mass., USA.
D.M. Cohen et al., "The AETG System: An Approach to Testing Based on Combinatorial Logic," IEEE Transactions on Software Eng'g, vol. 23, No. 7, Jul. 1997.
Traon et al., "Efficient object-oriented integration and regression testing," IEEE Trans. on Reliability, Mar. 2000.

* cited by examiner

*Primary Examiner* — Li Zhen
*Assistant Examiner* — Ryan Coyer
(74) *Attorney, Agent, or Firm* — Vazken Alexanian (57) ABSTRACT

Computer program testing after source code for the computer program has been modified is performed more quickly, by using execution conditions. First, second, and third execution conditions are determined. These execution conditions are used to perform testing of the program to determine whether the program is properly functioning. Particularly, test data on which basis testing of the computer program is performed can be classified as first test data, second test data, third test data, or fourth test data. The program prior to modification of the source code is tested by employing the first, second, and third test data. After the source code is modified, the program is retested by employing only the third and the fourth test data. The program is thus properly retested after source code modification by employing only the third and the fourth test data, without having to employ the first and the second test data.

17 Claims, 10 Drawing Sheets

```
01 IF A = 0
02   A := D1
03 ELSE
04   A := D2
05 END-IF
06 IF A = 1 OR A = 2
07   IF C = 0
08     CALL ERRPROC
09   END-IF
10 ELSE
11   IF NOT C = 0
12     CALL ERRPROC
13   END-IF
14 END-IF
15 IF B = 1
16   CALL PROC1
17 END-IF
```

FIG 4B

RDG for normal case

Sample Code (before Change)

```
IF A>0
  NEXT SENTENCE
ELSE
  B:=A+1
END
IF B=1        # Position L1
  MOVE A TO OUT-A
  MOVE B TO OUT-B
ELSE
  CALL ERRPROC
END
```

EC(abcd):  $A>0 \land (B=1)@L1$    $\rightarrow A>0 \land B=1$
EC(aefcd): $\neg A>0 \land (B=1)@L1$ $\rightarrow A=0$
EC(abcg):  $A>0 \land \neg(B=1)@L1$  $\rightarrow A>0 \land \neg(B=1)$ Test case (statement test + branch test):
Case abcd
  Data (A,B)=(1,1)    Supposed result (OUT-A,OUT-B)=(1,1)
  Data (A,B)=(1024,1) Supposed result (OUT-A,OUT-B)=(1024,1)
Case aefcd
  Data (A,B)=(0,1)    Supposed result (OUT-A,OUT-B)=(0,1)
  Data (A,B)=(0,0)    Supposed result (OUT-A,OUT-B)=(0,1)
Case abcg
  Data (A,B)=(1,0)    Supposed result Error Execution condition for target code: $(B=1)@L1 \rightarrow (A>0 \land B=1) \lor (A=0)$

Sample Code (after Change 2)

```
IF A>0
    NEXT SENTENCE
ELSE
    B:=A+1
END
IF B=0    # Position L2
    MOVE A TO OUT-A
    MOVE B TO OUT-B
END
IF B=1    # Position L1
    MOVE A TO OUT-A
    MOVE B TO OUT-B
ELSE
    CALL ERRPROC
END
```

FIG 7

(Before change)
Execution condition for target code:
$(A>0 \land B=1) \lor (A=0)$ (After change)
Execution condition for changed part:
$A>0 \land B=0$
Execution condition for target code:
$(A>0 \land B=0) \lor (A>0 \land B=1) \lor (A=0)$

FIG 8

COMPUTER PROGRAM TESTING AFTER SOURCE CODE MODIFICATION USING EXECUTION CONDITIONS

RELATED APPLICATIONS

The present patent application is a continuation of the previously filed patent application having Ser. No. 11/318,911, filed Dec. 24, 2005.

FIELD OF THE INVENTION

The present invention relates to testing a computer program to determine whether the computer program is properly functioning, and more particularly to improving the performance of such testing after the source code for the computer program has been modified, using execution conditions.

BACKGROUND OF THE INVENTION

Source code includes programming statements and instructions that are written by a programmer in accordance with a given computer programming language, such as C++, Java, or another type of computer programming language, for a given computer program. A programmer writes source code, but the source code may not be directly executable by a computing system. Rather, the source code is first converted into object code or executable code by a compiler, an assembler, or an interpreter. Alternatively, the source code may be interpreted while the computer program is itself being executed.

Testing of a computer program is typically accomplished to ensure that the source code of the computer program has been developed correctly, so that the computer program operates or performs properly. One type of testing includes developing a number of sets of test data, where the test data over all the sets is sufficient to ensure testing of all aspects of the computer program. That is, if testing of the computer program yields proper functioning of the computer program on the basis of all the sets of test data, then it can be concluded that the computer program is performing properly.

For a complex computer program, however, there may be a large number of test data sets. Therefore, testing of the computer program can be a time-consuming and laborious process. Each time the source code for the computer program is changed, generally what occurs is that the computer program is retested using all the sets of test data again, to ensure that the modification of the source code has not caused the computer program to no longer function properly. However, doing so is disadvantageous, since testing and retesting on the basis of all the sets of test data is so time-consuming.

For this and other reasons, therefore, there is a need for the present invention.

SUMMARY OF THE INVENTION

The present invention relates to improved-performance computer program testing after the source code for the computer program has been modified, by using execution conditions. A method of an embodiment of the invention thus pertains to source code for a computer program, and which includes an unchanged portion after source code modification and a changed portion after such modification. The method determines first, second, and third execution conditions. The first execution conditions are for determining whether the computer program is properly functioning, prior to modification of the source code. The second execution conditions are for determining whether the computer program is properly functioning, relating to the changed portion of the source code after modification. The third execution conditions are for determining whether the computer program is properly functioning, after modification of the source code.

Thus, the method uses the first, second, and third execution conditions to perform testing of the computer program to determine whether the computer program is properly functioning. In particular, test data on which basis testing of the computer program is performed can be classified as first test data, second test data, third test data, or fourth test data. The first test data is that which fulfills the first execution conditions and the third execution conditions, is unaffected by the changed portion of the source code after modification of the source code, and does not requiring retesting after modification of the source code. The second test data is that which fulfills the first execution conditions and the second execution conditions, is affected by the changed portion of the source code after modification of the source code, but does not require retesting after modification of the source code. The third test data is that which fulfills the first execution conditions, the second execution conditions, and the third execution conditions, is affected by the changed portion of the source code after modification of the source code, and requires retesting after modification of the source code.

Furthermore, the fourth test data can be constructed after the source code is modified. The fourth test data is that which fulfills the second execution conditions and the third execution conditions, is created to particularly test the changed portion of the source code after modification of the source code, and requires testing after modification of the source code. Therefore, the computer program prior to modification of the source code is tested by employing the first, second, and third test data. However, after the source code is modified, the computer program is retested by employing only the third and the fourth test data. That is, the computer program is properly retested after source code modification by employing only the third and the fourth test data, without having to employ the first and the second test data.

A computerized system of an embodiment of the invention includes at least a first component and a second component. The first component is to, for source code of a computer program that includes an unchanged portion after modification and a changed portion after modification, determine first execution conditions, second execution conditions, and third execution conditions, as have been described above. The second component is to classify test data on which basis testing of the computer program is performed as first, second, third, and fourth test data, as has also been described above. The system may also include a third component to test the computer program prior to modification of the source code using the first, second, and third test data, and to retest the computer program after modification of the source code using only the third and the fourth test data without using the first and second test data. Thus, the computer program is properly retested without using the first and second test data.

An article of manufacture of an embodiment of the invention includes a tangible computer-readable medium and means in the medium. The computer-readable medium may be a recordable data storage medium, for instance, or another type of tangible medium, whereas the means may be implemented as one or more computer programs stored on the medium. The means is at least for, in relation to source code of a computer program that includes an unchanged portion after modification and a changed portion after modification, determining first, second, and third execution conditions, as have been described above. The means may also be for classifying test data on which basis testing of the computer program is performed as first, second, third, and fourth test data, as has also been described above. The means may further be for testing the computer program on the basis of at least one of the first, second, third, and fourth test data, as has been described above as well.

Embodiments of the invention thus provide for advantages over the prior art. In particular, where testing of a computer program is accomplished on the basis of a number of test data, subsequent retesting of the computer program after modification of the source code for the computer program can be accomplished more quickly. This is because the test data is classified in accordance with a number of execution conditions. As a result, it can be determined which of the test data requires retesting as to the computer program after modification of the source code. That is, retesting of the computer program after source code modification does not require using all the test data, but only some of the test data. The execution conditions are determined and the test data are classified such that the portion of the test data on which basis the computer program is retested after source code modification still allows one to conclude whether the computer program is operating or functioning properly or correctly.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 4A is a diagram of sample source code, FIG. 4B is a diagram of a graph for a normal case for this source code.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Embodiments of the invention classify test data that is used to test whether a computer program is properly functioning into four types of test data, based on three execution conditions. These execution conditions are as follows. The first execution conditions are for determining whether the computer program is properly functioning, prior to source code for the computer program being modified. The second execution conditions are for determining whether the computer program is properly functioning, particularly in relation to the changed portion of the source code after modification. Finally, the third execution conditions are for determining whether the computer program is properly functioning, after modification of the source code.

The types of test data that embodiments of the invention can classify test data are as follows. The first test data is that which fulfills the first and the third execution conditions, is unaffected by the changed portion of the source code after modification thereof, and does not requiring retesting after modification of the source code. The second test data is that which fulfills the first and the second execution conditions, is affected by the changed portion of the source code after modification thereof, but does not require retesting after modification of the source code. The third test data is that which fulfills the first, the second, and the third execution conditions, is affected by the changed portion of the source code after modification thereof, and does require retesting after modification of the source code. The fourth test data is developed, constructed, or created after the source code has been modified. The fourth test data is that which fulfills the second and the third execution conditions, and is created to particularly test the changed portion of the source code after modification thereof, and thus requires testing after modification of the source code.

Figure 1:
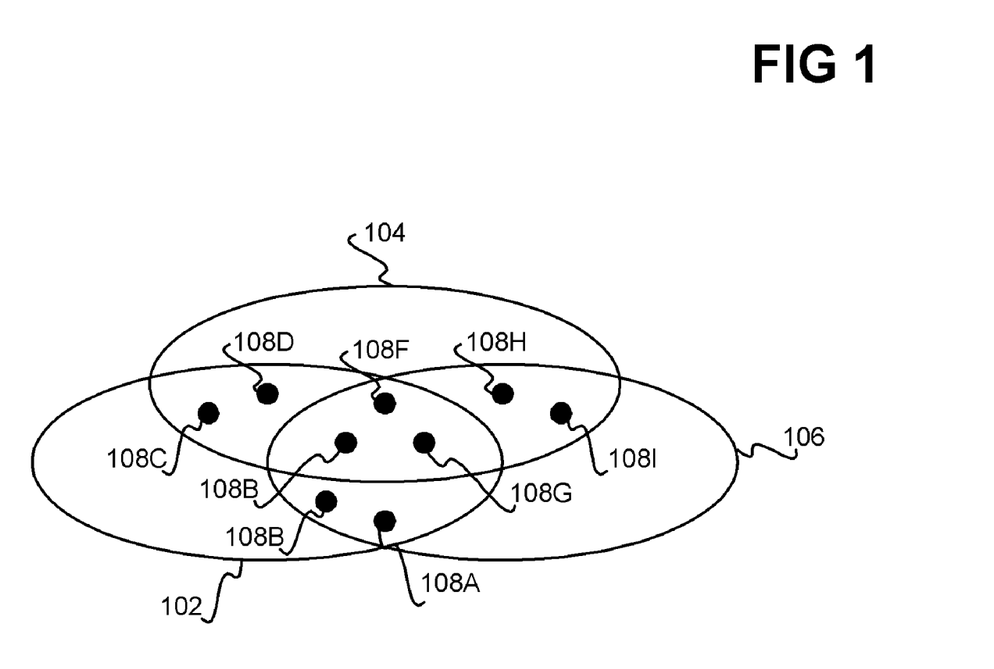
FIG. 1 is a diagram illustratively depicting classification of test data based at least one their fulfillment or satisfaction of execution conditions, according to an embodiment of the invention.

FIG. 1 illustratively depicts the classification of example test data in accordance with the first, second, and third execution conditions that have been described, according to an embodiment of the invention. The execution conditions that have been described are depicted in FIG. 1 as the first execution condition 102, the second execution condition 104, and the third execution condition 106. There are test data 108A, 108B, 108C, 108D, 108E, 108F, 108G, and 108H, collectively referred to as the test data 108, and classified into one of four types depending in part on the execution conditions 102, 104, and 106 that they fulfill.

For instance, the test data 108A and 108B are the first test data that have been described. The test data 108A and 108B fulfill the first and the third execution conditions 102 and 106, are unaffected by the changed portion of the source code, and do not require retesting after source code modification. The test data 108C and 108D are the second test data that have been described. The test data 108C and 108D fulfill the first and the second execution conditions 102 and 104, are affected by the changed portion of the source code, but do not require retesting after modification of the source code.

The test data 108E, 108F, and 108G are the third test data that have been described. The test data 108E, 108F, and 108G fulfill the first, second, and third execution conditions 102, 104, and 106, are affected by the changed portion of the source code, and require retesting after source code modification. The test data 108H and 108I are the new fourth test data that have been described, constructed after the source code has been modified. The test data 108H and 108I fulfill the second and the third execution conditions 104 and 106, and require testing after source code modification.

Figure 2:
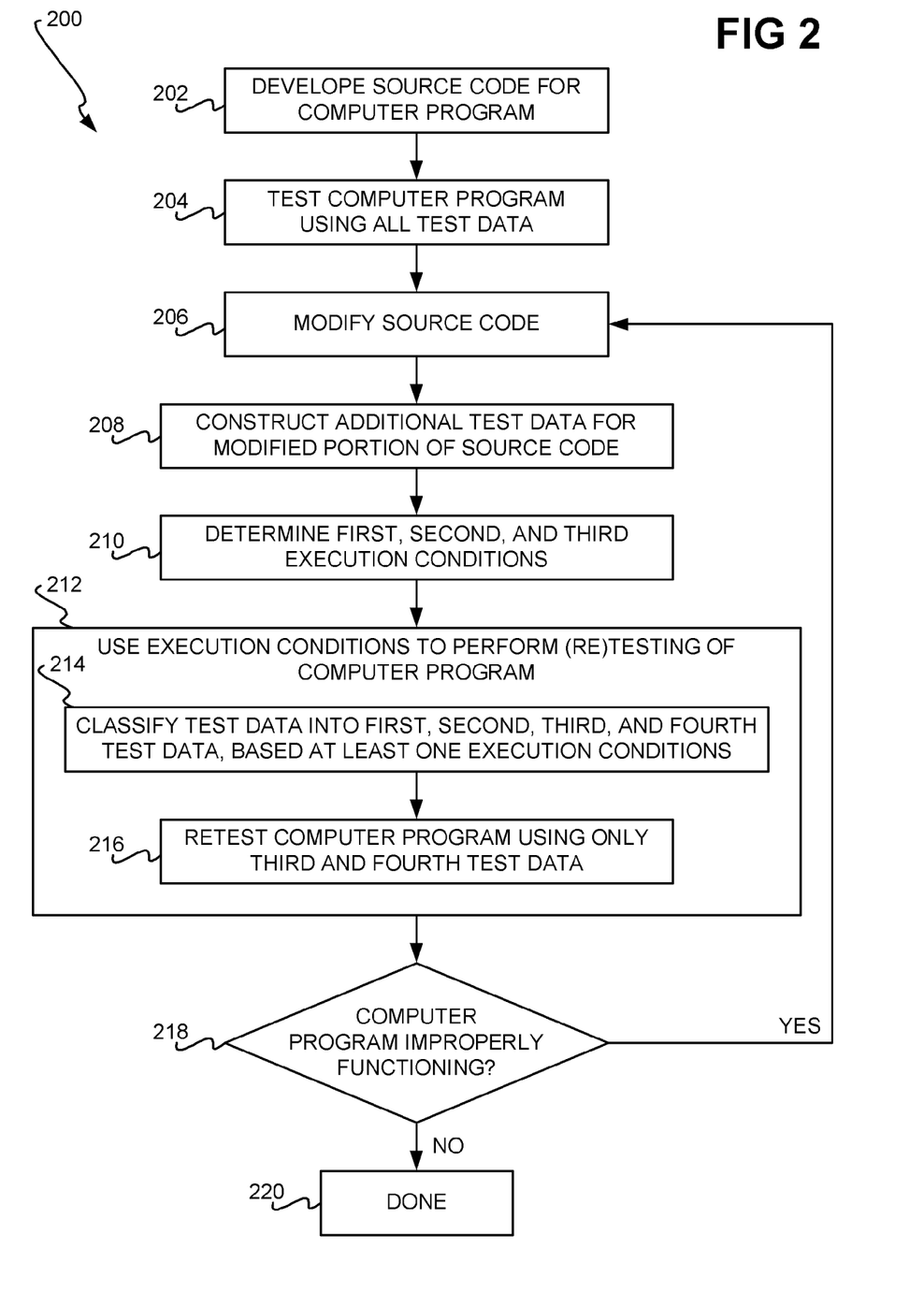
FIG. 2 is a flowchart of a method for testing a computer program, particularly such testing with improved performance after source code for the computer program has been modified, according to an embodiment of the invention, and is suggested for printing on the first page of the patent.

FIG. 2 shows a method 200 for testing and retesting a computer program for which source code has been developed and then modified, according to an embodiment of the invention. The source code for the computer program is initially developed (202), and the computer program is tested using all test data (204). At this stage of the method 200, for instance, the first, second, and third test data that has been described has been constructed so far, and therefore the computer program is tested using all such test data. Thereafter, the source code is modified (206). Additional test data may then be constructed for specifically testing the modified portion of the source code (208), which is the fourth test data that has been described above, and where other portions of the source code remain unmodified.

Next, the first, second, and third execution conditions that have been described are determined (210). Furthermore, for instance, one or more execution paths of execution of the source code may be structured, where each leads to a non-error testing result or an error testing result, to assist in determining the execution conditions. In addition, a graph may be employed for the execution paths to assist determining the execution conditions. These approaches are described in more detail later in the detailed description.

Next, the execution conditions are used to (re)test the computer program (212). In particular, all of the test data that has been constructed is classified into first, second, third, and fourth test data (214), based at least on the execution conditions. Execution paths of execution of the source code may be structured, and/or a graph may be employed for the execution paths, as with determining the execution conditions, to assist classification. That is, by virtue of determination of the execution conditions in relation to the execution paths, which test data satisfy which execution conditions is necessarily determined, as can be appreciated by those of ordinary skill within the art. In at least some embodiments, classification of the test data as the first, second, third, and fourth test data is accomplished upon determination of the execution conditions as is conventional, as can be appreciated by those of ordinary skill within the art, and further description is not provided herein. It is noted, however, that the fourth test data is simply classified as such, because it is the additional test data constructed in part 208 of the method 200.

The computer program is then retested using only the third and the fourth test data (216). That is, whereas initial testing of the computer program in 204 uses the first, second and third test data, subsequent retesting only requires the third and the newly created fourth test data. By virtue of the classification of the test data, only the third and the fourth test data have to be used to verify proper operation and functioning of the computer program. Stated another way, even though the computer program is not tested on the basis of the first and the second test data, it can be concluded upon retesting the computer program on the basis of just the third and the fourth test data that the computer program is properly functioning or not. If it is determined that the computer program is properly functioning (218), then the method 200 is finished (220). Otherwise, the iterative process of the method 200 is repeated beginning at part 206.

To find the execution conditions that have been described, in relation to various parts of the source code for a computer program, the source code and the positions of the lines of the source code are analyzed. Furthermore, source code patterns or positions at which errors occur may be input for each different type of error. Input of such error-related information allows the creation of a structure for the execution conditions, which improves reusability. What follows is a description of structuring error conditions to assist in their determination, followed by a description of also determining error conditions by using a graph, which is referred to herein as an RDG. That is, an execution path is first specifically described, and then a graph that encompasses a number of such execution paths is specifically described. Error conditions essentially correspond to execution paths, and these execution paths are selected within the graph in a particular way, as is described later in the detailed description.

Execution conditions are determined for a computer program to reach a specified position from the starting point of the source code, or when the program terminates abnormally. An abnormal termination is a program termination that results when an error occurs. Such a termination portion of the computer program, as caused by an error, is identified by a code pattern. A set of execution paths that terminate abnormally is referred to as an error case. In addition, a set of execution paths that reach a specified position within the source code upon execution of the computer program is referred to as a normal case. Once these execution paths have been determined, the execution conditions can be likewise easily determined therefrom, as can be appreciated by those of ordinary skill within the art, and which of the test data satisfy which of the execution conditions can then easily be determined, as can also be appreciated by those of ordinary skill within the art.

Figure 3:
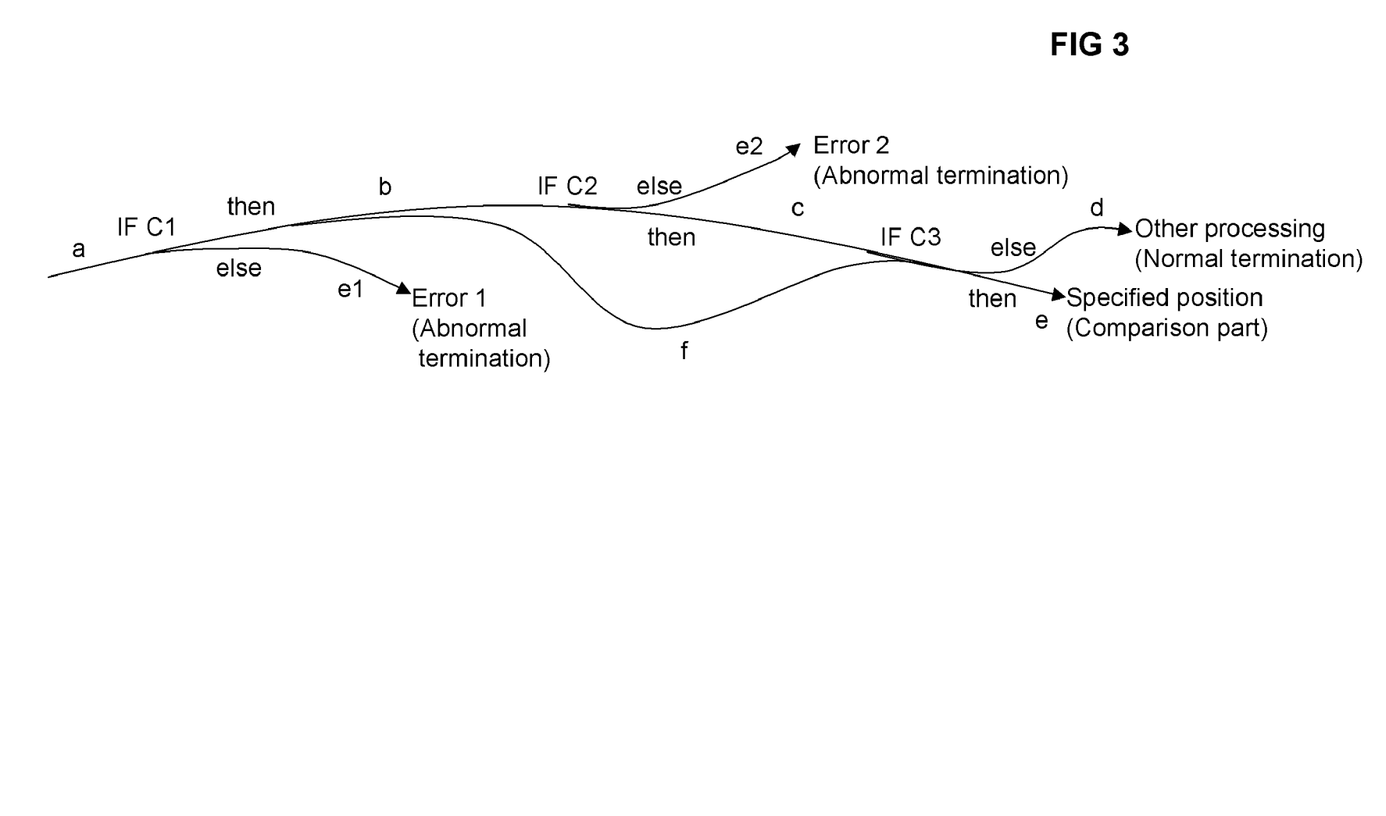
FIG. 3 is a diagram showing example execution paths for source code of a computer program, according to an embodiment of the invention

FIG. 3 shows example execution paths for source code of a computer program, according to an embodiment of the invention. In FIG. 3, the paths (a, b, c, e) and (a, b, f, c) are normal, non-error cases, and paths (a, e1) and (a, b, e2) are error cases. The execution conditions for a normal, non-error case include the conditions to avoid error cases. Furthermore, even in error cases, when execution conditions are found for each type of error, the execution conditions to avoid other types of errors are also included. For example, in relation to FIG. 3, the execution conditions for error 1 and error 2 are $\neg C1$, $C1 \wedge \neg C2$ and $C1 \wedge C2 \wedge C3$, respectively. Therefore, the number of different execution conditions can be quite long, due to execution conditions resulting from different types of errors.

Furthermore, by using the order in which the errors occur, execution conditions for each error can be concisely determined. It is assumed that there is an order relationship represented by "$\rightarrow$" between occurrences of errors. Thus, $e1 \rightarrow e2$ indicates that the error e2 occurs after the error e1 occurs. Furthermore, where $e[i] \rightarrow e[j]$, then the following is true:

$$D(e[j]) \wedge \neg L(e[i]) = L(e[j]) \quad (1)$$

In equation (1), L(e) represents the execution condition for error e, and D(e) is the execution condition from which the execution conditions to avoid other errors have been removed. Furthermore, in the case where there is no e[i] that satisfies $e[i] \rightarrow e[j]$, then $D(e[j]) = L(e[j])$. Thus, D (e[j]) can be determined. It is also noted that when there are multiple e[i] that satisfy $e[i] \rightarrow e[j]$, from e[0] through e[n], the following is true:

$$D(e[j]) \wedge \neg L(e[0]) \wedge \ldots \wedge \neg L(e[n]) = L(e[j]) \quad (2)$$

For example, in the previous example, the execution conditions for errors 1 and 2 may be L(e1) and L(e2), where $L(e1) = \neg C1$ and $L(e2) = C1 \wedge \neg C2$. Therefore, $D(e1) = \neg C1$ and $D(e2) = \neg C2$ because $e1 \rightarrow e2$. This process can be applied for the relationship between the normal case and the error case as well, to determine the execution conditions for the non-error case. In this situation, for instance, due to e2→ the normal case, the execution condition for the normal case is D(normal case)=C3.

Therefore, according to the order of the errors and the normal cases, the execution conditions for each case are determined in a straightforward manner. Such simplified execution conditions can then be evaluated. For example, in the case of the example of FIG. 3, when evaluation D(normal case), D(e1) and D(e2) are evaluated first because L(normal case)=¬D(e1)∧D(normal case).

Next, how determining execution conditions can be assisted by using a graph is described. A graph is created for each desired section of the source code. The graph describes the conditions to execute the source code along one or more execution paths. Such a graph is referred to as an RDG. By removing some aspects of the graph, one or more execution paths result, in direct correspondence to the execution conditions. Therefore, the process in one embodiment is one of essentially first determining the graph, and then determining the execution paths therefrom, to determine the execution conditions as corresponding to these paths.

In such a graph, from the initial node thereof to a terminal node thereof, the execution path can be determined by considering the logical product of the nodes along the path. Therefore, in order to determine the execution conditions for a normal case, for instance, the logical value TRUE is added to the terminal nodes of the path, and FALSE is added to the other nodes. As a result, by considering the parent-child relationships of the graph as the logical products and the sibling relationships of the graph as logical sums, the graph shows the execution conditions. That is, by considering just the TRUE nodes, the execution conditions for the normal case are determined, by removing the FALSE nodes from the execution path to result in these execution conditions. Similarly, in order to determine the execution conditions for an error case, the logical value TRUE is added to the terminal nodes of the path that yield the errors in question, and FALSE is added to the other terminal nodes. Thus, considering just the TRUE nodes results in determination of these execution conditions for the error case as well, by removing the FALSE nodes from the execution path to result in these execution conditions.

Figure 4A:
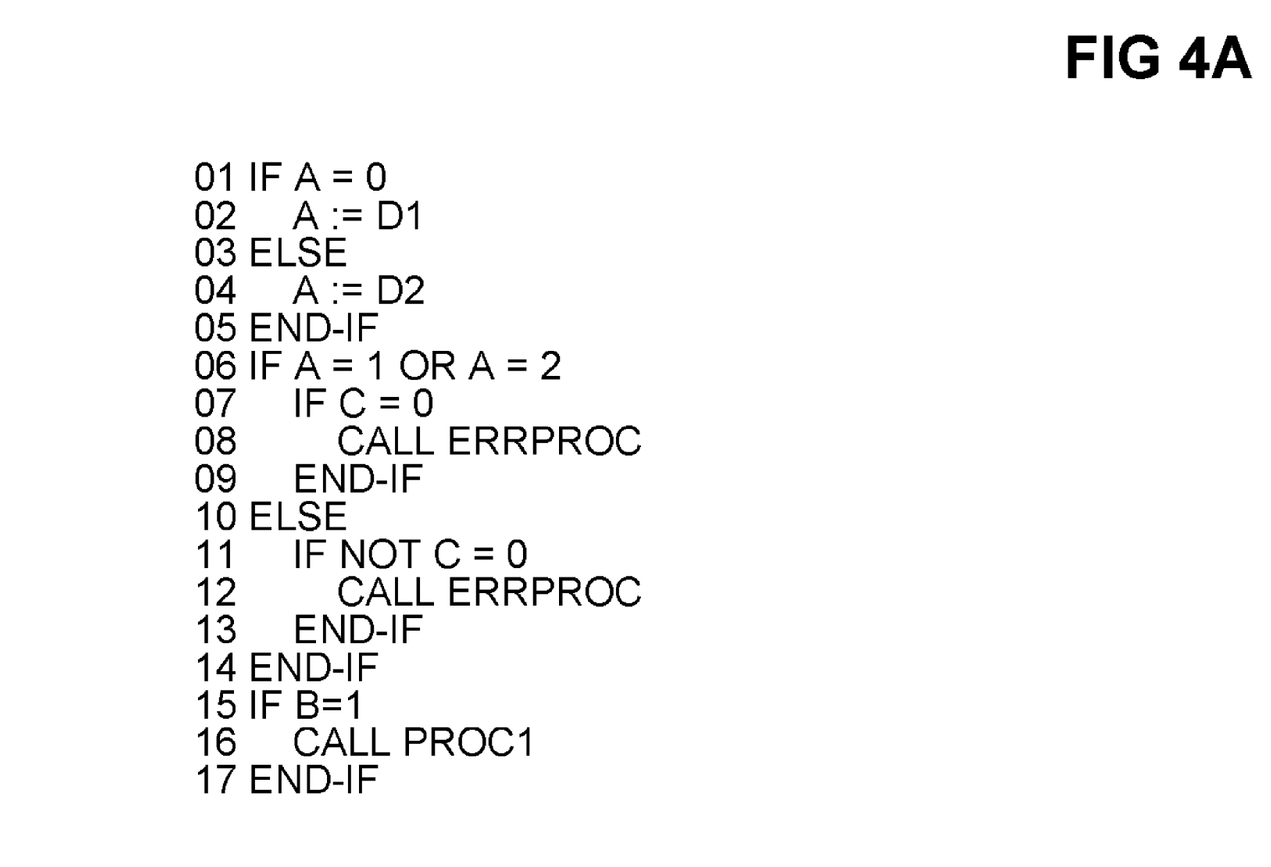
Figure 4B:
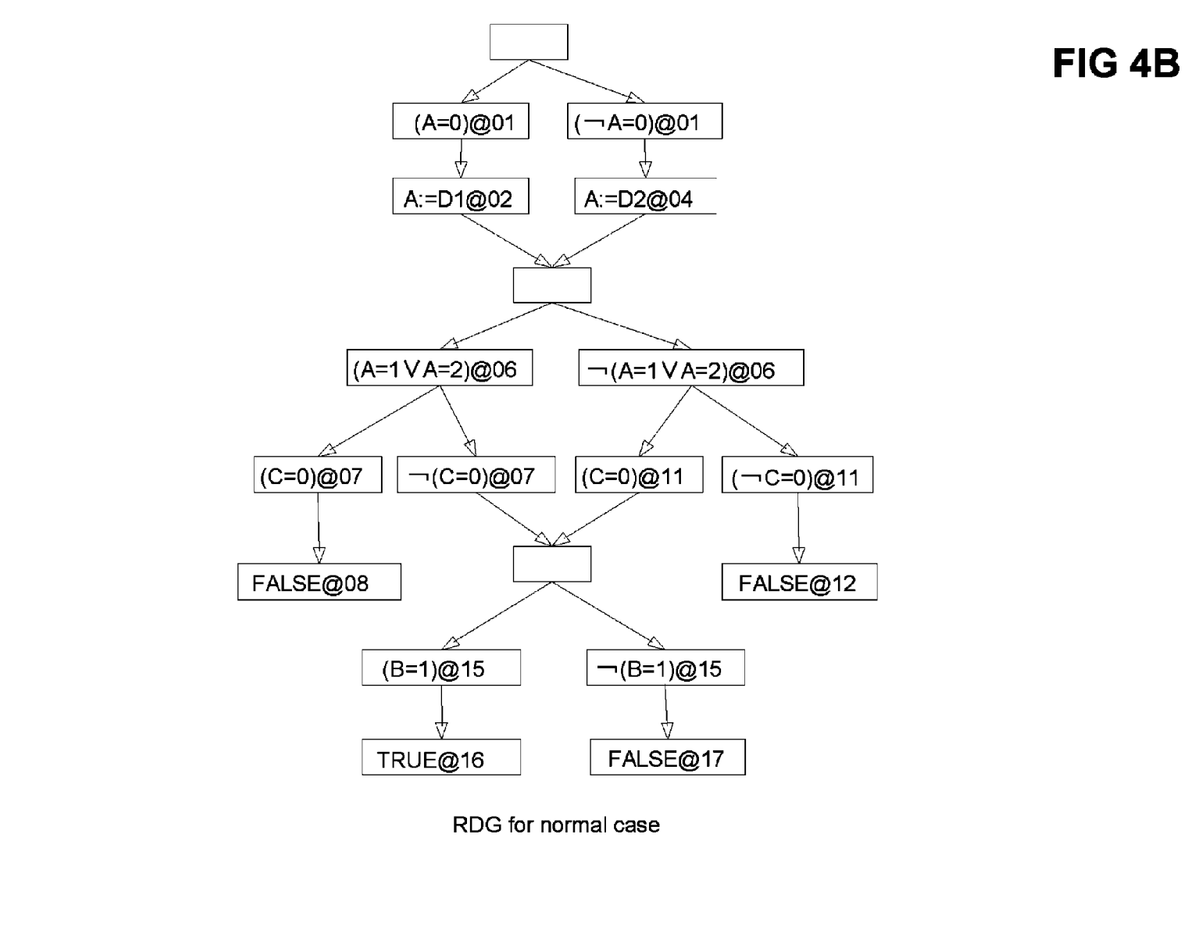
Figure 4C:
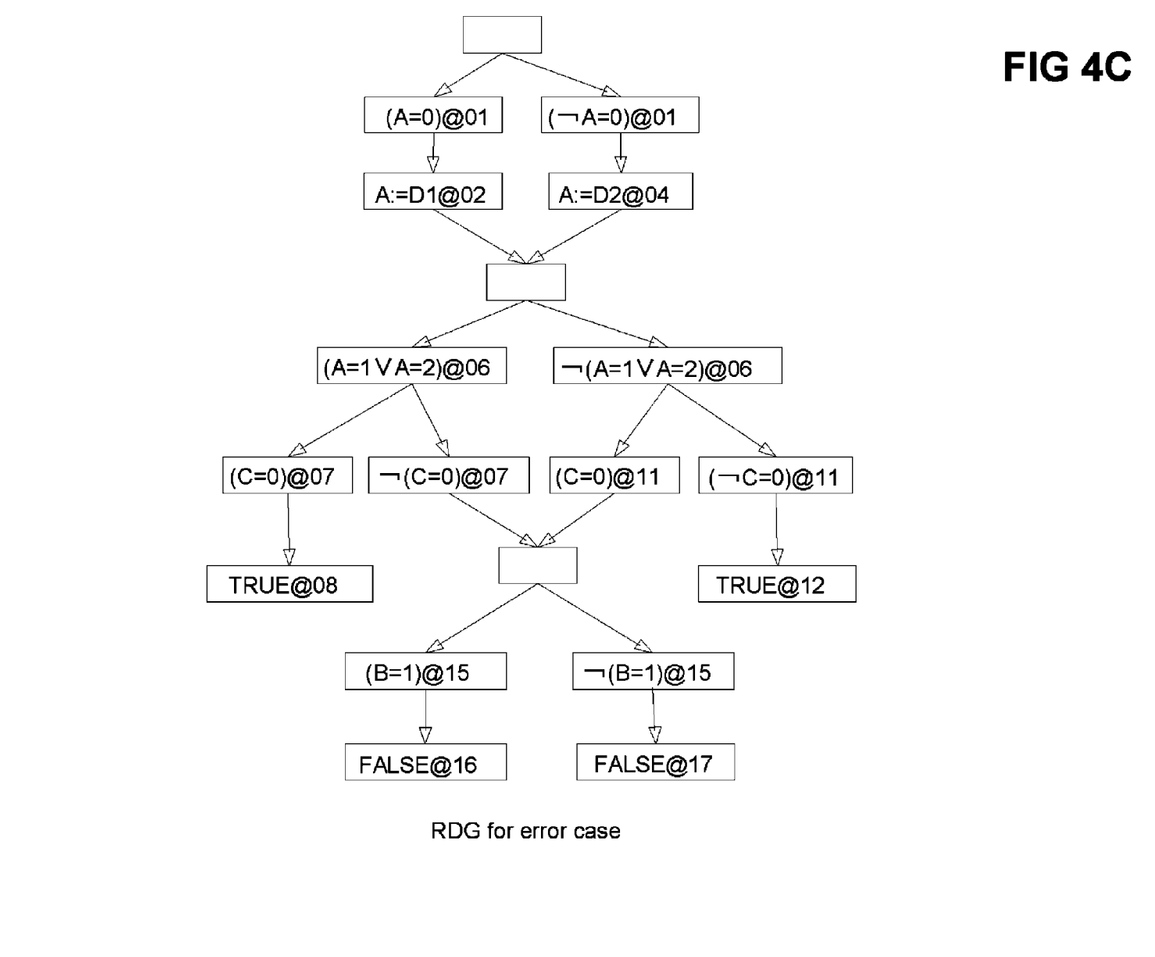
FIG. 4C is a diagram of a graph for an error case for this source code, according to an embodiment of the invention.

As an example, FIG. 4A shows sample source code, FIG. 4B shows the graph for a normal case for this source code, and FIG. 4C shows the graph for an error case for this source code, according to an embodiment of the invention. In FIGS. 4B and 4C, the symbol "@" is used to denote the position within the source code for which the desired normal or error condition is located. It is noted that the graph that has been described is equivalent to a condition dependence graph, as known within the art. The execution conditions are those the paths within the graph that are not ended in FALSE values. That is, the execution conditions can be determined by considering just the paths that end in TRUE values.

Figure 5:
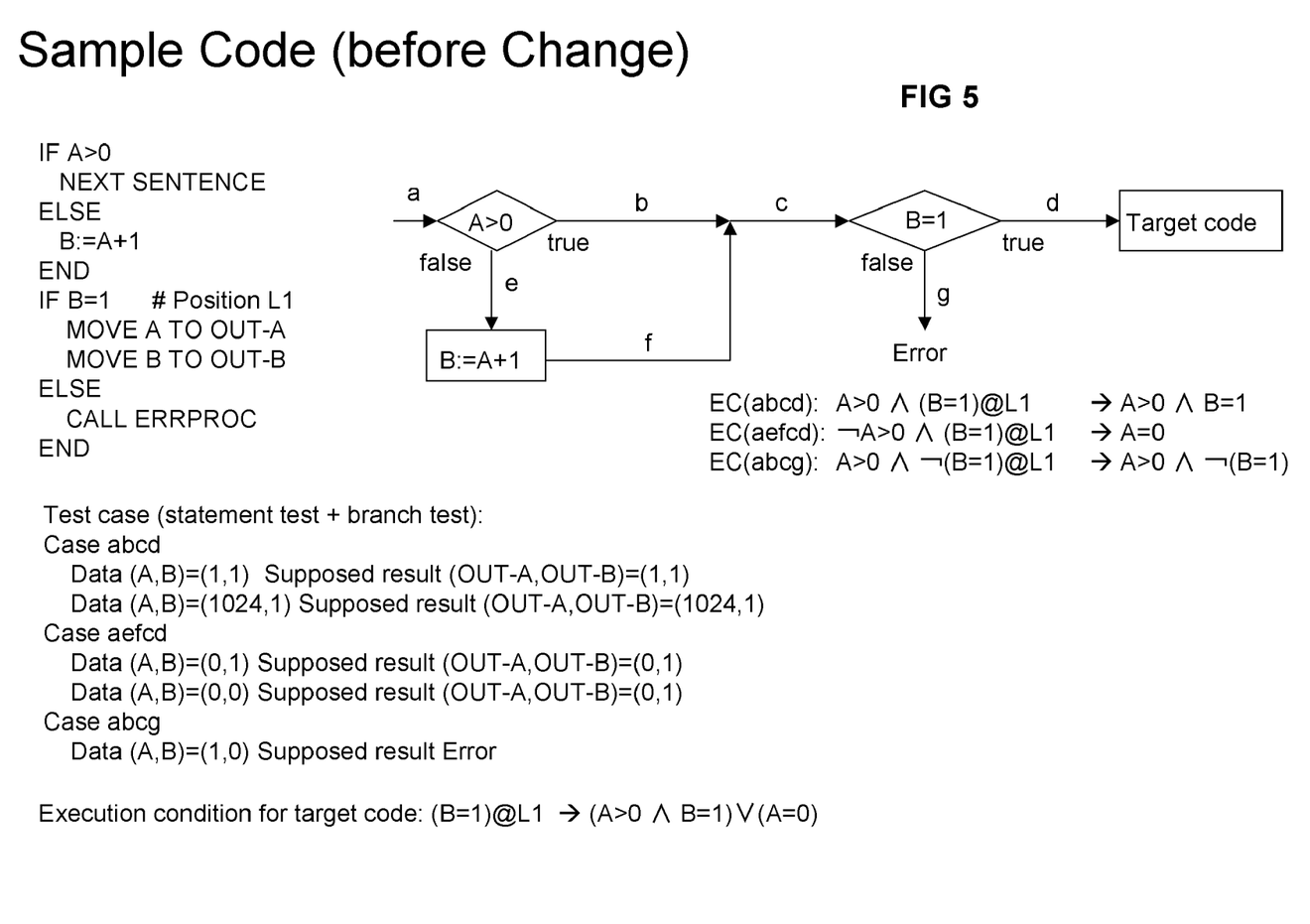
FIG. 5 is a diagram of example source code prior to modification, and an execution path of this source code, according to an embodiment of the invention.
Figure 6:
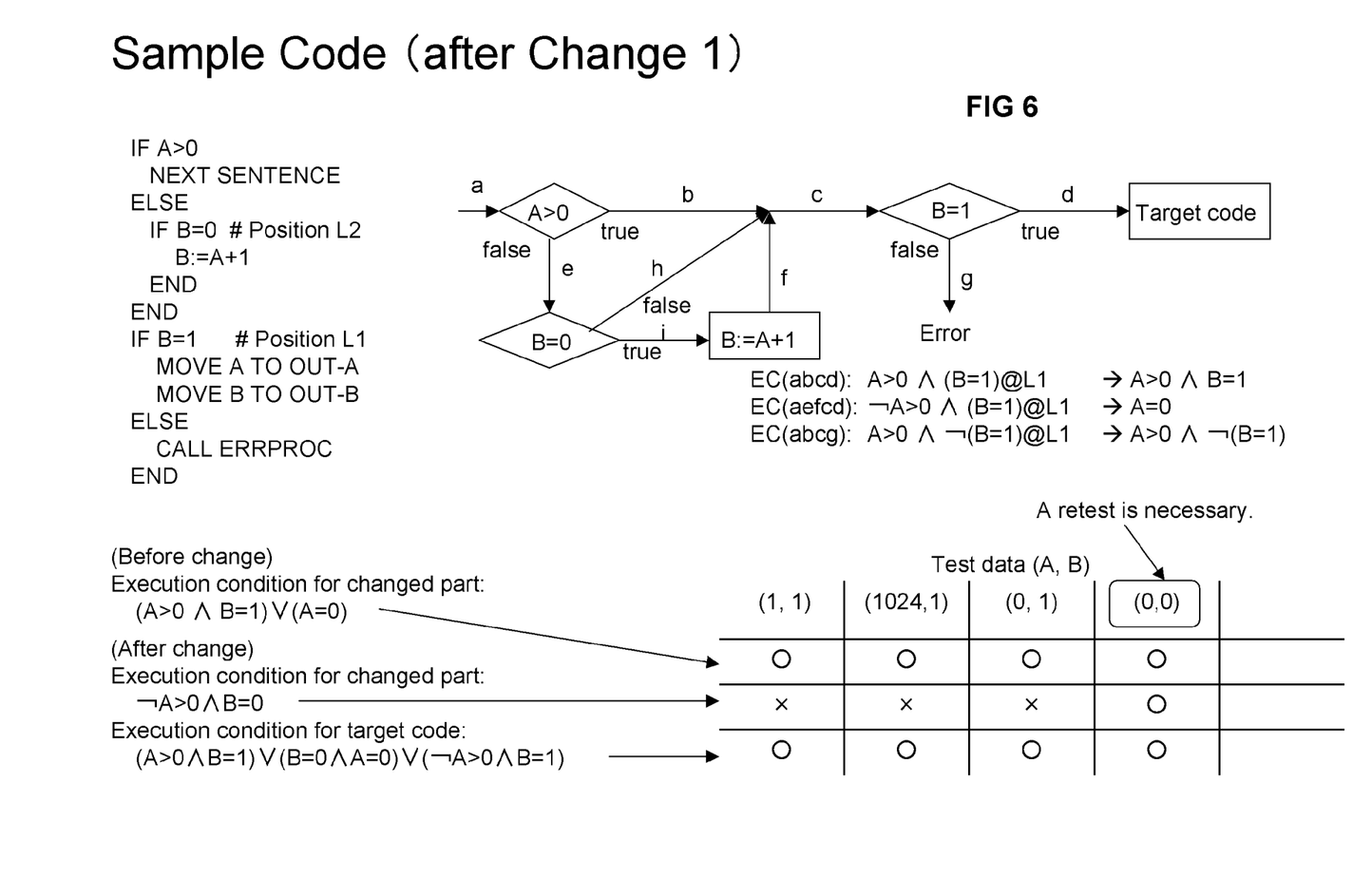
FIG. 6 is a diagram of the example source code of FIG. 5 and the execution path thereof after a first change has been made, according to an embodiment of the invention.
Figure 7:
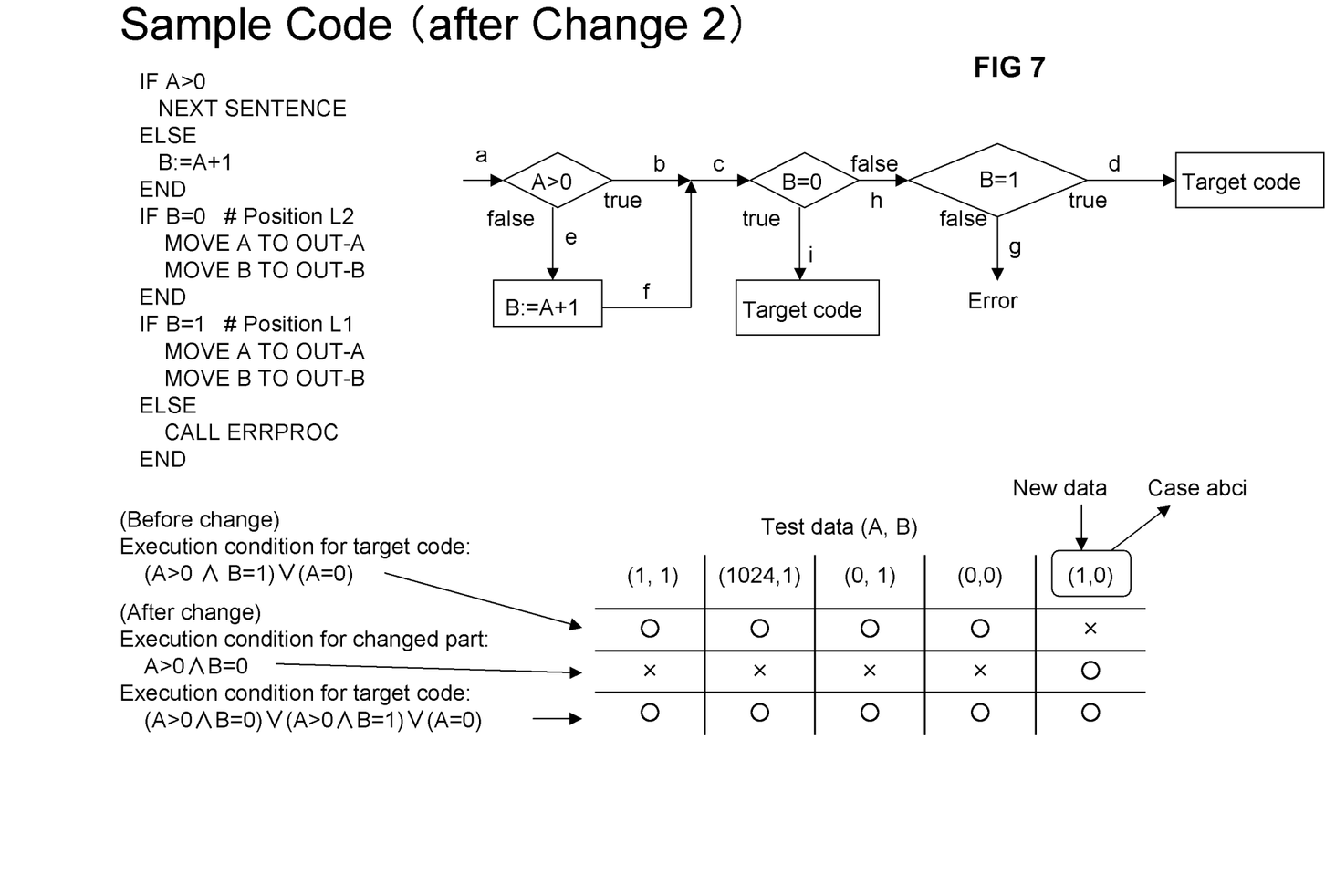
FIG. 7 is a diagram of the example source code of FIG. 5 and the execution path thereof after a second change has been made, subsequent to the change of FIG. 6, according to an embodiment of the invention.

Next, FIG. 5 shows example source code prior to modification, and an execution path of this source code, according to an embodiment of the invention. By comparison, FIG. 6 shows the example source code and the execution path thereof after a first change has been made, and FIG. 7 shows the example source code and the execution path thereof after a second change has been made, according to an embodiment of the invention. Furthermore, in FIGS. 6 and 7, in the lower right-hand corners thereof, a table is depicted in each figure in which representative test data is denoted along the tops of the columns, and the first, second, and third execution conditions that have been described above are denoted along the left-hand sides of the rows. In the resulting table, the letter "O" indicates that the execution condition in question is relevant to the test data in question, whereas the letter "X" indications that the execution condition in question is not applicable to the test data in question. That is, "O" represents true, and "X" represents false.

Thus, in relation to each of FIGS. 6 and 7, the change that is made to the source code results in a corresponding change to the execution path. As a result of the change to the execution path, changes in the execution conditions in relation to the test data can be easily determined. In this way, which of the three execution conditions is or are relevant for each test data can be determined, so that it is known whether or not a given test data has to be retested when retesting the computer program after the modification to the source code for the program has been made. Furthermore, in relation to FIG. 7 only, new test data is added, which corresponds to the fourth type of test data that has been described. Retesting of the computer program in relation to this fourth test data is necessary, since this test data was not present before.

Figure 8:
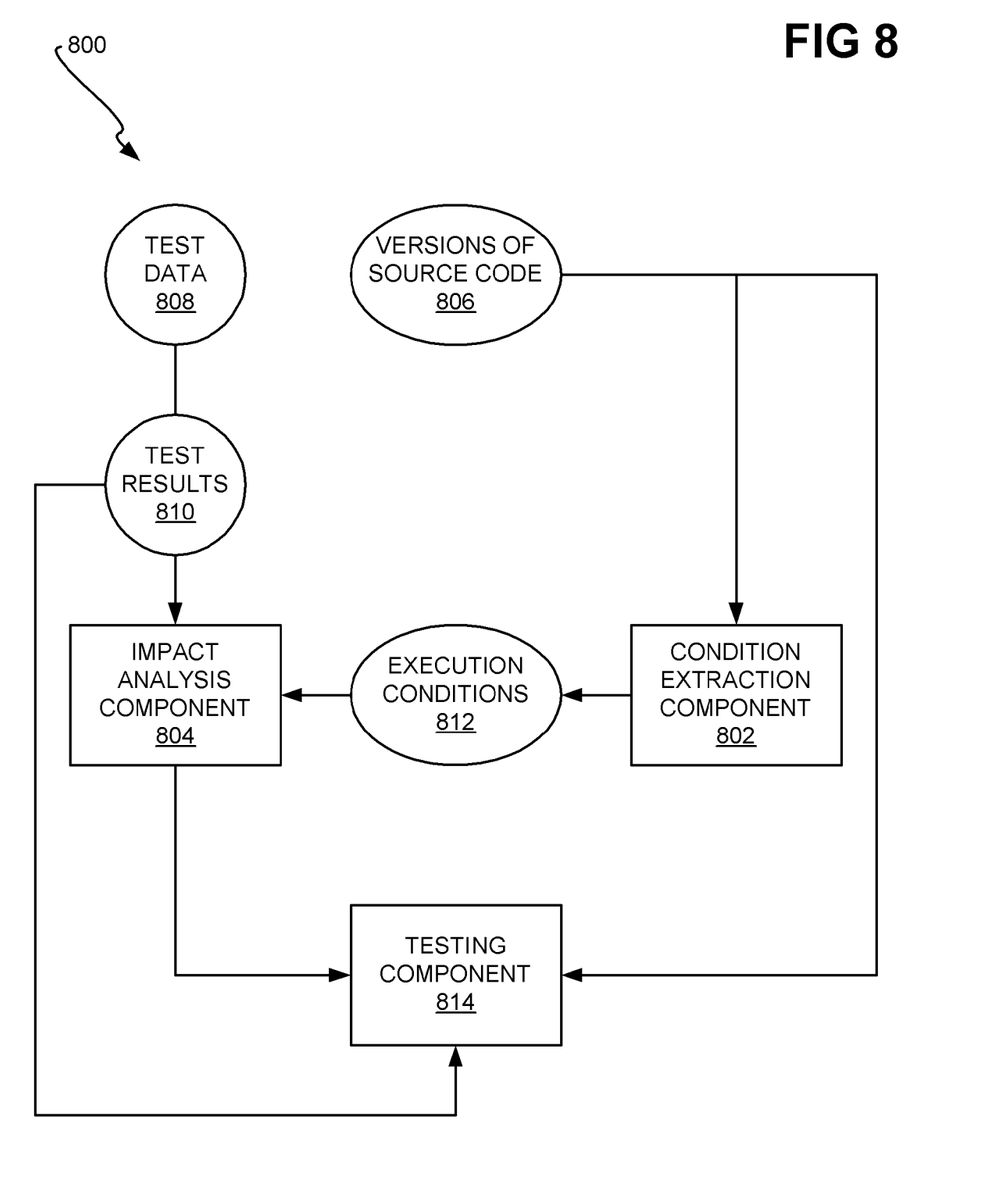
FIG. 8 is a block diagram of a computerized system, according to an embodiment of the invention.

FIG. 8 shows a computerized system 800, according to an embodiment of the invention. The system 800 is for testing various versions of source code 806 for a computer program, where each version represents one or more changes having been made to one or more portions of an immediately previous version of the source code. The system 800 includes a condition extraction component 802, an impact analysis component 804, and a testing component 814. Each of these components 802, 804, and 814 may be implemented in software, hardware, or a combination of software and hardware. Furthermore, as can be appreciated by those of ordinary skill within the art, the system 800 may include other components, in addition to and/or in lieu of those depicted in FIG. 8.

The versions of the source code 806 for the computer program being developed are input into the condition extraction component 802, which extracts the three execution conditions 812 that have been described by, for instance, analyzing the execution paths thereof and constructing an RDG thereupon, as has been described. The execution conditions 812 are input into the impact analysis component 804. The test data 808 and the expected test results 810 of this test data 808 in relation to the computer program are also input into the input analysis component 804. The condition extraction component 802 can be said to perform part 210 of the method 200 that has been described.

The impact analysis component 804 classifies the test data 808 into the four types of test data that have been described. This is accomplished by analyzing the test data 808 against the versions of the source code 806 to determine whether the test data 808 results in the desired or expected test results 810 or not. In so doing, it can thus be determined which of the three execution conditions 812 each of the test data 808 satisfies. The net result of the impact analysis component 804 is thus this classification of the test data 808. It is noted that manner by which such test data classification is accomplished in at least some embodiments of the invention is conventional, such that additional description thereof is not duplicated here. However, it is noted herein that analysis of the test data 808 against the versions of the source 806 to classify the test data 808 does not involve a complete testing of the computer program, and in this way performance is enhanced, since subsequent testing does not have to use all of the test data 808, as has been described. The impact analysis component can be said to perform part 214 of the method 200 that has been described.

Finally, the testing component 814 tests the computer program, as may have been compiled by different versions of the source code 806, to determine whether the computer program is properly functioning or not. The testing component 814 utilizes those test data of the test data 808 as needed to properly perform such testing, as determined by the classification of the test data 808 into the four various types, as has been described, for instance, in relation to part 216 of the method 200. The testing component 814 can thus perform parts 204 and 216 of the method 200 that has been described.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. Therefore, it is manifestly intended that this invention be limited only by the claims and equivalents thereof.

We claim:

1. A method comprising:
   for source code of a computer program that includes an unchanged portion after modification and a changed portion after modification, determining:
      first execution conditions for determining whether the computer program is properly functioning, prior to modification of the source code;
      second execution conditions for determining whether the computer program is properly functioning, relating to the changed portion of the source code after modification;
      third execution conditions for determining whether the computer program is properly functioning, after modification of the source code; and,
   using the first, second, and third execution conditions to perform testing of the computer program to determine whether the computer program is properly functioning,
   wherein using the first, second, and third execution conditions to perform testing of the computer program comprises classifying test data on which basis testing of the computer program is performed as:
      first test data that fulfills the first execution conditions and the third execution conditions but that does not fulfill the second execution condition, is unaffected by the changed portion of the source code after modification of the source code, and does not requiring retesting after modification of the source code;
      second test data that fulfills the first execution conditions and the second execution conditions but that does not fulfill the third execution condition, is affected by the changed portion of the source code after modification of the source code, but does not require retesting after modification of the source code; and,
      third test data that fulfills the first execution conditions, the second execution conditions, and the third execution conditions, is affected by the changed portion of the source code after modification of the source code, and requires retesting after modification of the source code.

2. The method of claim 1, further comprising initially:
   developing the source code; and,
   modifying the source code.

3. The method of claim 1, further comprising:
   modifying the source code where the computer program is improperly functioning; and,
   retesting the computer program using the first, second, and third execution conditions.

4. The method of claim 1, wherein using the first, second, and third execution conditions to perform testing of the computer program further comprises:
   testing the computer program prior to modification of the source code, by employing the first test data, the second test data, and the third test data; and,
   retesting the computer program after modification of the source code, by employing the third test data,
   such that after modification of the source code, the computer program is properly retested by employing the third test data, without employing the first test data and the second test data.

5. The method of claim 1, wherein determining the first, second, and third execution conditions comprises structuring one or more execution paths of execution of the source code as each leading to one of a non-error testing result and an error testing result.

6. The method of claim 1, wherein determining the first, second, and third execution conditions comprises employing a graph for one or more execution paths of execution of the source code.

7. A computerized system comprising:
   hardware, including at least a processor and memory;
   a first component implemented at least by the hardware to, for source code of a computer program that includes an unchanged portion after modification and a changed portion after modification, determine first execution conditions, second execution conditions, and third execution conditions,
      the first execution conditions for determining whether the computer program is properly functioning, prior to modification of the source code;
      the second execution conditions for determining whether the computer program is properly functioning, relating to the changed portion of the source code after modification;
      the third execution conditions for determining whether the computer program is properly functioning, after modification of the source code; and,
   a second component implemented at least by the hardware to classify test data on which basis testing of the computer program is performed as:
      first test data that fulfills the first execution conditions and the third execution conditions but that does not fulfill the second execution condition, is unaffected by the changed portion of the source code after modification of the source code, and does not requiring retesting after modification of the source code;
      second test data that fulfills the first execution conditions and the second execution conditions but that does not fulfill the third execution condition, is affected by the changed portion of the source code after modification of the source code, but does not require retesting after modification of the source code; and,
      third test data that fulfills the first execution conditions, the second execution conditions, and the third execution conditions, is affected by the changed portion of the source code after modification of the source code, and requires retesting after modification of the source code.

8. The computerized system of claim 7, further comprising a third component to test the computer program prior to modification of the source code using the first, second, and third test data, and to retest the computer program after modification of the source code using the third test data without using the first and second test data, such that the computer program is properly retested without using the first and second test data.

9. The computerized system of claim 7, wherein the second component is further to classify the test data as new fourth test data on which basis testing of the computer program is performed, the fourth test data fulfilling the second execution conditions and the third execution conditions, is created to particularly test the changed portion of the source code after modification of the source code, and requires testing after modification of the source code.

10. The computerized system of claim 9, further comprising a third component to test the computer program prior to modification of the source code using the first, second, and third test data, and to retest the computer program after modification of the source code using only the third and the fourth test data without using the first and second test data, such that the computer program is properly retested without using the first and second test data.

11. The computerized system of claim 7, wherein the first component is to determine the first, second, and third execution conditions by structuring one or more execution paths of execution of the source code as each leading to one of a non-error testing result and an error testing result.

12. The computerized system of claim 7, wherein the first component is to determine the first, second, and third execution conditions by employing a graph for one or more execution paths of execution of the source code.

13. A non-transitory computer-readable data storage medium storing computer-executable code executable by a processor to perform a method comprising:
for source code of a computer program that includes an unchanged portion after modification and a changed portion after modification, determining:
first execution conditions for determining whether the computer program is properly functioning, prior to modification of the source code;
second execution conditions for determining whether the computer program is properly functioning, relating to the changed portion of the source code after modification;
third execution conditions for determining whether the computer program is properly functioning, after modification of the source code; and,
using the first, second, and third execution conditions to perform testing of the computer program to determine whether the computer program is properly functioning, wherein using the first, second, and third execution conditions to perform testing of the computer program comprises classifying test data on which basis testing of the computer program is performed as:
first test data that fulfills the first execution conditions and the third execution conditions but that does not fulfill the second execution condition, is unaffected by the changed portion of the source code after modification of the source code, and does not requiring retesting after modification of the source code;
second test data that fulfills the first execution conditions and the second execution conditions but that does not fulfill the third execution condition, is affected by the changed portion of the source code after modification of the source code, but does not require retesting after modification of the source code; and,
third test data that fulfills the first execution conditions, the second execution conditions, and the third execution conditions, is affected by the changed portion of the source code after modification of the source code, and requires retesting after modification of the source code.

14. The non-transitory computer-readable data storage medium of claim 13, wherein using the first, second, and third execution conditions to perform testing of the computer program further comprises:
testing the computer program prior to modification of the source code, by employing the first test data, the second test data, and the third test data; and,
retesting the computer program after modification of the source code, by employing the third test data,
such that after modification of the source code, the computer program is properly retested by employing the third test data, without employing the first test data and the second test data.

15. The non-transitory computer-readable data storage medium of claim 13, wherein using the first, second, and third execution conditions to perform testing of the computer program further comprises:
constructing new fourth test data on which basis testing of the computer program is performed, the fourth test data fulfilling the second execution conditions and the third execution conditions, is created to particularly test the changed portion of the source code after modification of the source code, and requires testing after modification of the source code;
testing the computer program prior to modification of the source code, by employing the first test data, the second test data, and the third test data;
retesting the computer program after modification of the source code, by employing only the third test data and the fourth test data,
such that after modification of the source code, the computer program is properly retested by employing only the third test data and the fourth test data, without employing the first test data and the second test data.

16. The non-transitory computer-readable data storage medium of claim 13, wherein determining the first, second, and third execution conditions comprises structuring one or more execution paths of execution of the source code as each leading to one of a non-error testing result and an error testing result.

17. The non-transitory computer-readable data storage medium of claim 13, wherein determining the first, second, and third execution conditions comprises employing a graph for one or more execution paths of execution of the source code.

* * * * *